United States Patent [19] [11] Patent Number: 6,063,127
Ziger [45] Date of Patent: May 16, 2000

[54] METHOD FOR ADAPTIVE SAMPLING FOR BUILDING ACCURATE COMPUTER MODELS

[75] Inventor: David H. Ziger, San Antonio, Tex.

[73] Assignee: VLSI Technology, Inc., San Jose, Calif.

[21] Appl. No.: 09/064,014

[22] Filed: Apr. 20, 1998

[51] Int. Cl.[7] ................................................. G06F 9/455
[52] U.S. Cl. ............................................................. 703/2
[58] Field of Search ........................ 395/500.23, 500.27, 395/500.34; 364/165

[56] References Cited

U.S. PATENT DOCUMENTS 5,062,066  10/1991  Scher et al. ........................ 395/500.27
5,136,497   8/1992  Coe et al. ................................ 364/165

Primary Examiner—Kevin J. Teska
Assistant Examiner—Dan Fiul
Attorney, Agent, or Firm—Wagner, Murabito & Hao LLP

[57] ABSTRACT

A method of adaptive sampling for accurate computer model building. The present invention is used in conjunction with a computer system to build models of responses, functions, and the like, that produce a given output for a given input(s). One embodiment in accordance with the present invention includes a computer system, software instructions, and a function to be modeled. The present embodiment directs the computer system to generate a set of equidistant data points for the function based on an input value. The present embodiment directs the computer to use a modeling curve to generate a set of prediction data points based on the odd positioned data points of the equidistant data points. The present embodiment directs the computer to determine whether the locations of the predicted data points satisfy a predetermined convergence criterion with respect to the determined locations of the even positioned data points of the equidistant data points. If the convergence criterion is not satisfied, the input value is increased and the present embodiment directs the computer to repeat the above process. A computer modeling process in accordance with the present invention improves the efficiency of building computer models by enabling a computer to model a function, and the like, using as few data points as possible. Furthermore, the present invention enables a computer user to determine the convergence criterion that must be satisfied before the computer stops modeling the desired function. Therefore, the present invention enables computers to model responses efficiently while accurately modeling them.

24 Claims, 7 Drawing Sheets

METHOD FOR ADAPTIVE SAMPLING FOR BUILDING ACCURATE COMPUTER MODELS

TECHNICAL FIELD

The field of the present invention pertains to computer software. More particularly, the present invention relates to computer software used to model functions, responses, processes, and the like, that produce a given output for a given input or inputs.

BACKGROUND ART

Computers are useful functional devices which are fabricated in a variety of sizes ranging from computers which occupy large office space down to computers which are held in one's hand. These varying sizes of computers also perform an extremely wide variety of useful operations, depending on the software which is installed within their particular memory storage device. For instance, computers can manage numerous financial transactions of a bank, control the fabrication of items ranging from automobiles down to integrated circuit chips, store addresses and telephone numbers of acquaintances, enable someone to produce and edit documents, along with transmitting and receiving data. Furthermore, computers are also used to model varying responses, functions, processes, and the like, that produce a given output for a given input or inputs in order to more thoroughly understand them. For instance, computers can be used to model complex weather patterns, characteristics of a transistor within an integrated circuit, the tidal flows of the oceans throughout the world, the flow of electrons through varying diameters and types of metals, and the amount of turbulence created by an automobile at varying wind speeds.

There are different prior art methods implemented with software which enable computers to model different processes, responses, and functions. One of the typical prior art methods of computer modeling is to have the software select evenly spaced incremental data points and determine the actual results for the function at those selected incremental data points. But there are disadvantages associated with this prior art method of modeling. One of the disadvantages associated with this method is that it can require a great amount of computing time when the function to be modeled is very complex. For example, if a complex function to be modeled has many different independent variables, choosing a set increment for each variable of that function results in the number of data points to be determined scaling to the power of the number of variables. In other words, if there are 20 different independent variables of a given function and the set increment for each variable results in 100 data points for each variable, $100^{20}$ or $1 \times 10^{22}$ input data points would result. As such, a significant amount of computing time can be required to calculate the respective outputs for such a large amount of input data points.

Another typical prior art method of computer modeling is referred to as design of experiment, or commonly referred to as DOE. Design of experiment is a methodology of choosing specific data points of the response to be modeled, based on the mathematical equations being used to build the model. For example, if the function to be modeled is a linear function, a design of experiment approach suggests determining a high data point and a low data point in order to model the desired response. Even though design of experiment approach is able to reduce the number of data points used to model a particular response, there are still disadvantages associated with this prior art method of modeling.

Thus, what is desired is a method for accurately building computer models of responses, functions, processes, and the like, that produce a given output for a given input or inputs. What is further desired is a method for efficiently building accurate computer models of these types of functions, responses, and processes.

DISCLOSURE OF THE INVENTION

The present invention includes a method of adaptive sampling for building accurate computer models of functions, processes, and responses. The present invention is used in conjunction with a computer system to build models of processes, responses, functions, and the like, that produce a given output for a given input or inputs. One embodiment in accordance with the present invention includes a computer system, software instructions, and a function to be modeled. Specifically, the present embodiment directs the computer system to generate a set of equidistant data points for the function based on an input value. The present embodiment directs the computer to use a modeling curve to generate a set of prediction data points based on the odd positioned data points of the equidistant data points. The present embodiment directs the computer to determine whether the locations of the predicted data points satisfy a predetermined convergence criterion with respect to the determined locations of the even positioned data points of the equidistant data points. If the convergence criterion is not satisfied, the input value is increased and the present embodiment directs the computer system to repeat the above process.

A computer modeling process in accordance with the present invention improves the efficiency of building computer models by enabling a computer system to model a function, process, response, and the like, using as few data points as possible. Furthermore, the present invention enables a user of the computer to determine the convergence criterion that must be satisfied before the computer system stops modeling the desired function. Therefore, the present invention enables computers to model responses efficiently while accurately modeling them.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
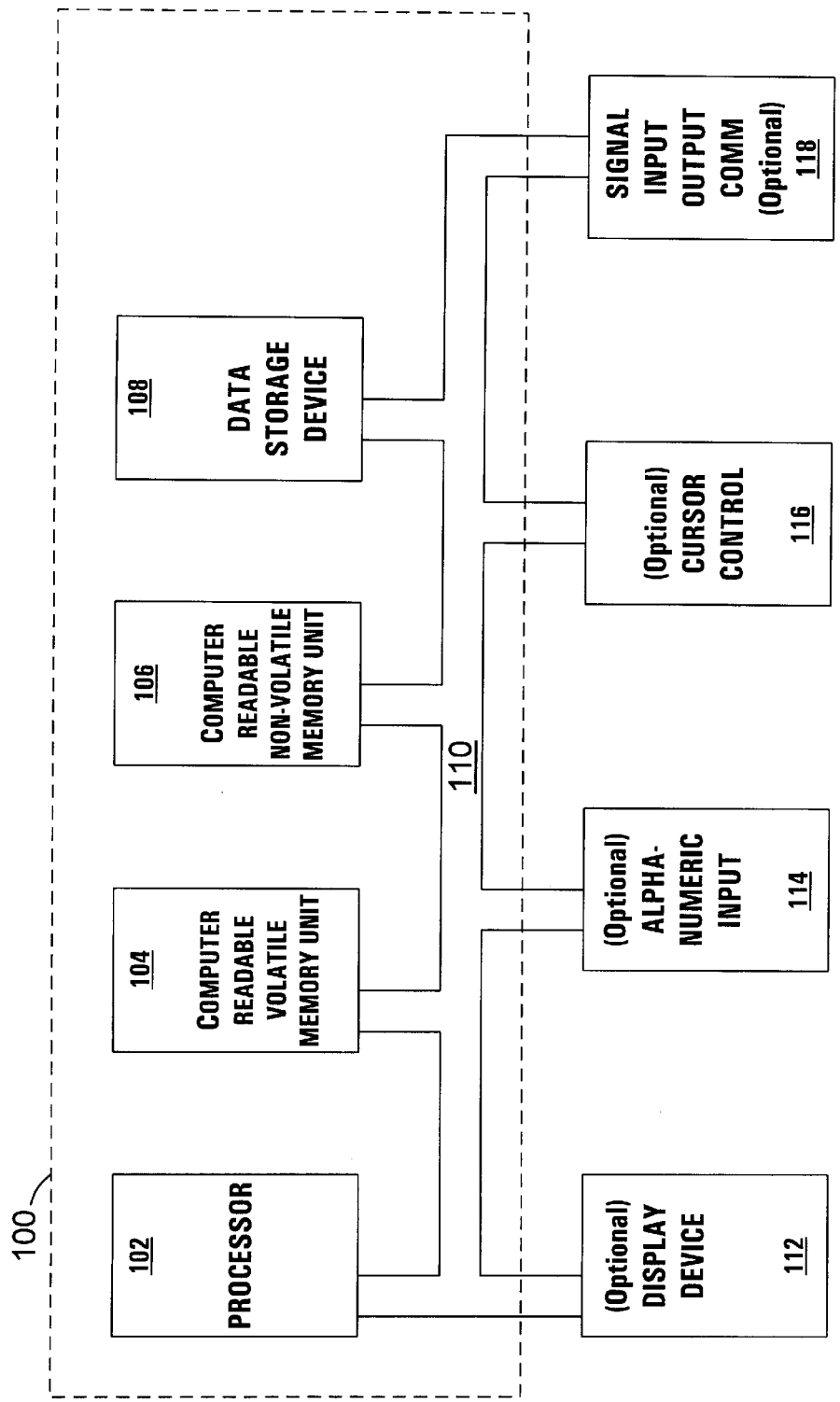
FIG. 1 is a block diagram of a computer system used in accordance with the present invention.

In the following detailed description of the present invention, a method of adaptive sampling for building accurate computer models, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow (e.g., process 200 of FIG. 2) are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

As previously described above, computers can perform an extremely wide variety of useful operations, depending on the software which is installed within their particular memory storage device. For instance, computers can control the fabrication of items ranging from integrated circuit chips up to automobiles, store addresses and telephone numbers of acquaintances, manage numerous financial transactions of a bank, enable someone to produce and edit documents, along with transmitting and receiving data. Furthermore, computers are also used to model various processes, responses, functions, and the like, that produce a given output for a given input or inputs in order to more thoroughly understand them. For instance, computers can be used to model characteristics of a transistor within an integrated circuit, complex weather patterns, the amount of turbulence created by an automobile at varying wind speeds, and the flow of electrons through varying diameters and types of metals.

The present invention is a method for improving the efficiency of building accurate computer models for functions, responses, and the like, that produce a given output for a given input or inputs. One method in accordance with the present invention includes a computer system, software instructions, and a function to be modeled. Specifically, the present embodiment directs the computer system to generate a set of equidistant data points for the function based on an input value. The present embodiment directs the computer to use a modeling curve to generate a set of prediction data points based on the odd positioned data points of the equidistant data points. The present embodiment directs the computer to determine whether the locations of the predicted data points satisfy a predetermined convergence criterion with respect to the locations of the even positioned data points of the equidistant data points. If the convergence criterion is not satisfied, the input value is increased and the present embodiment directs the computer system to repeat the above process.

The present invention improves the efficiency of building computer models by enabling a computer system to model a function, process, response, and the like, using as few data points as possible. Furthermore, the present invention enables the user of the computer to determine the convergence criterion that must be satisfied before the computer system stops modeling the desired function. Therefore, the present invention enables computers to model complex functions efficiently while accurately modeling them.

FIG. 1 is a block diagram of a computer system 100 used in accordance with the present invention. Within the following discussions of the present invention, certain processes and steps are discussed (e.g., process 200 of FIG. 2) that are realized, in one embodiment, as a series of instructions (e.g., software program) that reside within computer readable memory units of computer system 100 and executed by processors of computer system 100. When executed, the instructions cause computer system 100 to perform specific actions and exhibit specific behavior which is described in detail below.

In general, computer system 100 of FIG. 1 used by an embodiment of the present invention comprises an address/data bus 110 for communicating information, one or more central processors 102 coupled with bus 110 for processing information and instructions, a computer readable volatile memory unit 104 (e.g., random access memory, static RAM, dynamic RAM, etc.) coupled with bus 110 for storing information and instructions (e.g., modeling software) for central processor(s) 102, a computer readable non-volatile memory unit 106 (e.g., read only memory, programmable ROM, flash memory, EPROM, EEPROM, etc.) coupled with bus 110 for storing static information and instructions for processor(s) 102. Computer system 100 also includes a mass storage computer readable data storage device 108 such as a magnetic or optical disk and disk drive (e.g., hard drive or floppy diskette) coupled with bus 110 for storing information and instructions. Optionally, computer system 100 can include an alphanumeric input device 114 including alphanumeric and function keys coupled to bus 110 for communicating information and command selections to central processor(s) 102, a cursor control device 116 coupled to bus 110 for communicating user input information and command selections to central processor(s) 102, a signal generating device 118 coupled to bus 110 for communicating command selections to processor(s) 102, and a display device 112 coupled to bus 110 for displaying information (e.g., modeled functions) to the computer user. Display device 112 utilized with computer system 100 of the present invention can be a liquid crystal device, cathode ray tube, or any other display device suitable for creating graphic images and alphanumeric characters recognizable to the user.

Figure 2:
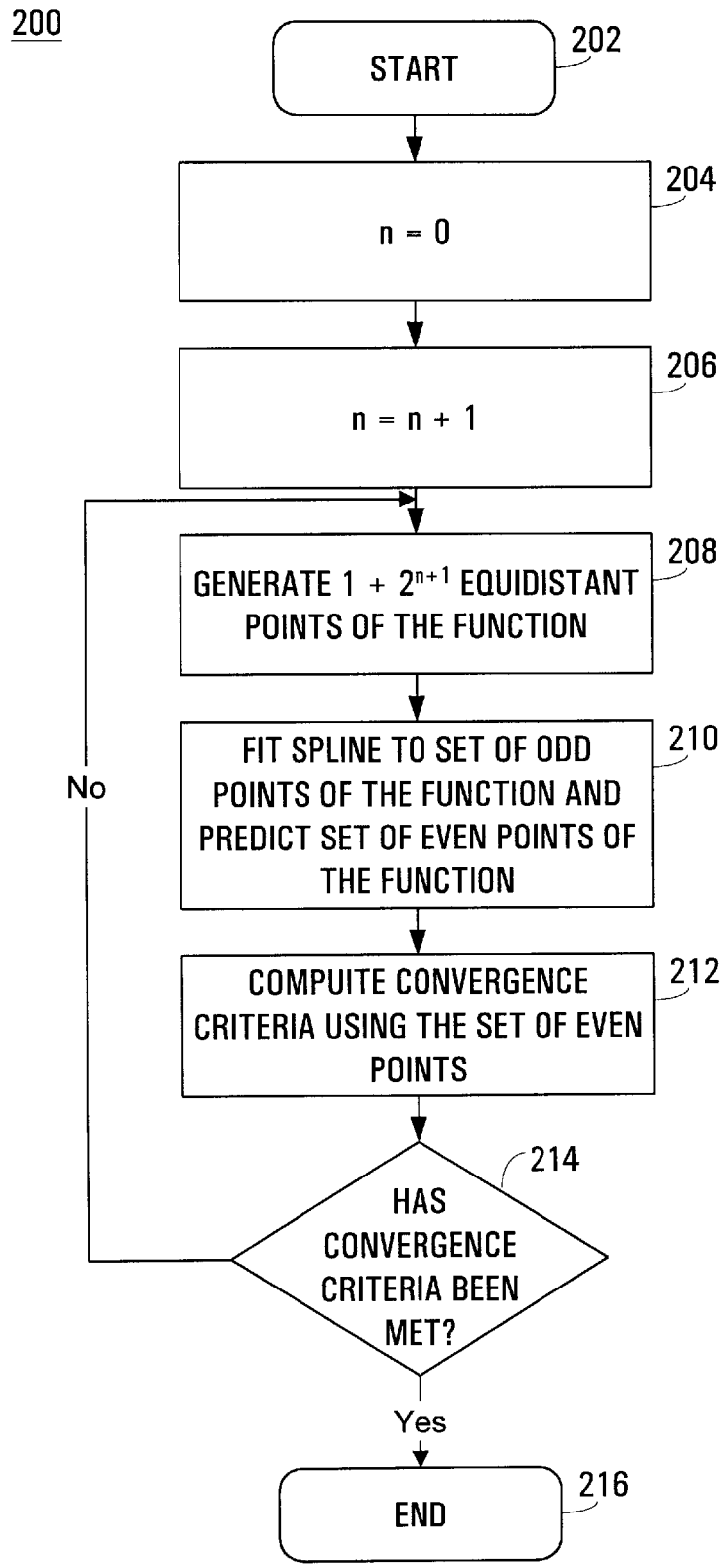
FIG. 2 is a flowchart of a method in accordance with one embodiment of the present invention for adaptive sampling for building accurate computer models of functions.
Figure 3A:
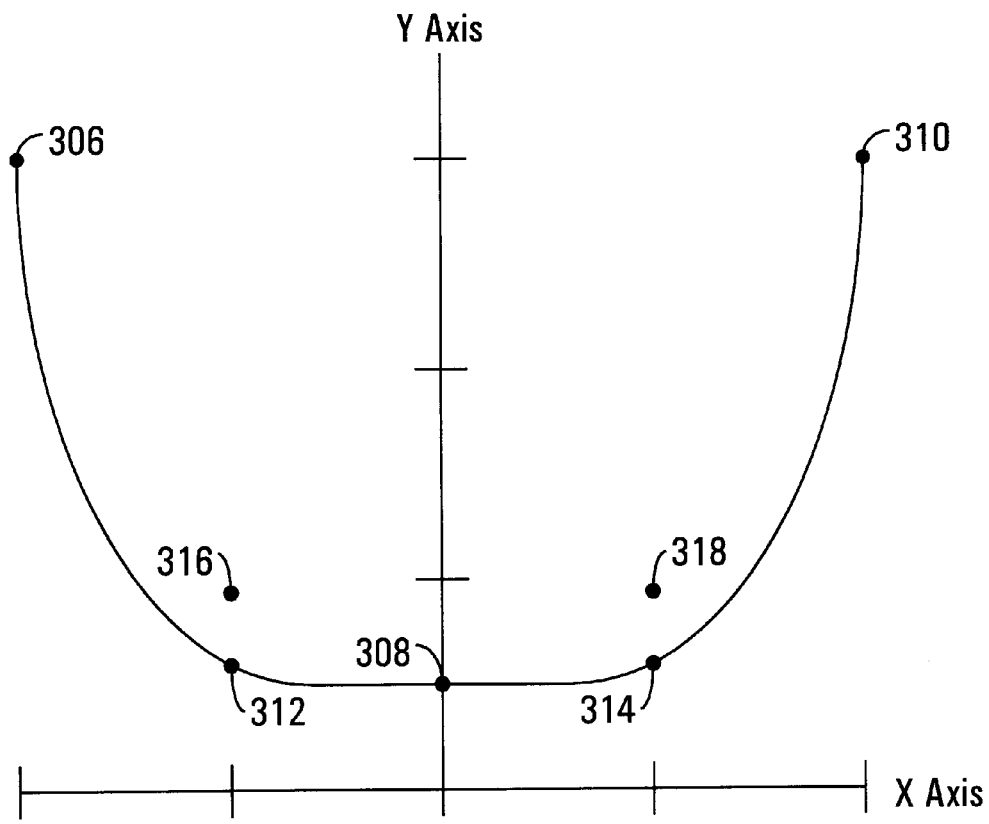
FIG. 3A is a graph representing a function being modeled by a computer system using the method of FIG. 2 in accordance with the present invention.
Figure 3B:
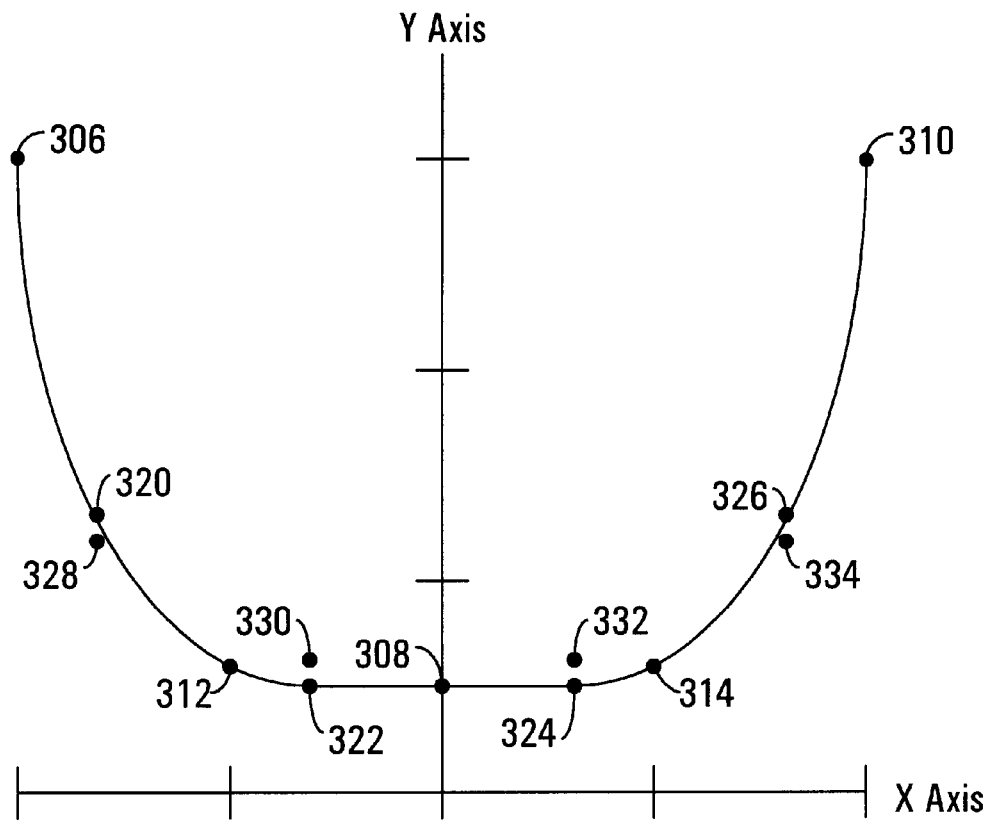
FIG. 3B is a graph representing the function of FIG. 3A further modeled by the computer system using the method of FIG. 2 in accordance with the present invention.
Figure 3C:
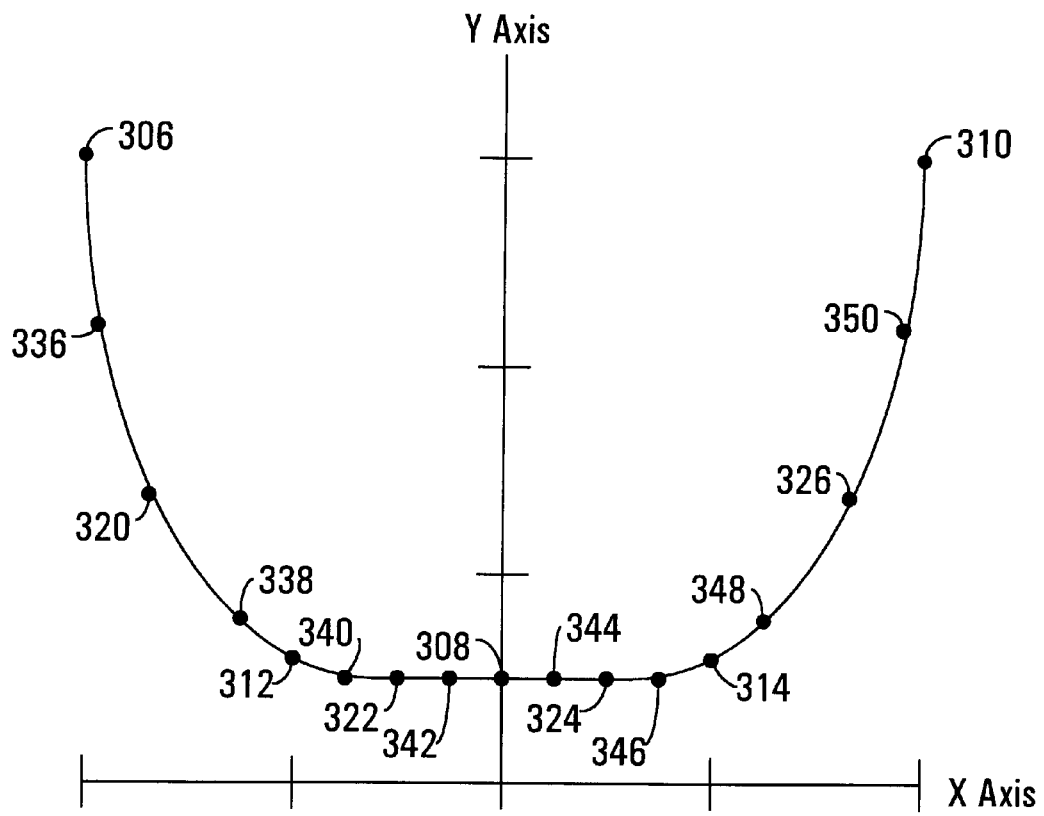
FIG. 3C is a graph representing the function of FIG. 3B further modeled by the computer system using the method of FIG. 2 in accordance with the present invention.

FIG. 2 is a flowchart of a method 200 in accordance with one embodiment of the present invention of adaptive sampling for building accurate computer models for functions, responses, processes, and the like, that produce a given output for a given input or inputs. In order to more fully understand method 200, FIGS. 3A–3C will be discussed in conjunction with FIG. 2. The solid curved line shown in FIGS. 3A–3C represents a physical function 300, which can be modeled by the present invention. It should be appreciated that even though FIGS. 3A–3C show a two dimensional function to be modeled, computer models can be built in multiple dimensions. As such, the present invention is equally well suited to model functions in any number of dimensions. In step 202, the present embodiment directs computer system 100 of FIG. 1 to start process 200. At step 204, the present embodiment directs computer system 100 to set a variable n to be equal to the value of zero.

In step 206 of FIG. 2, the present embodiment directs computer system 100 to increase the value of variable n by the value of one.

At step 208 of FIG. 2, the present embodiment directs computer system 100 to generate a specific amount of equidistant data points for a given function (e.g., function 300 of FIG. 3A) that is being modeled. It should be appreciated that the present invention is also well suited to direct computer system 100 to generate a specific amount of non-equidistant data points for a given function that is being modeled. It should be further appreciated that the present invention is able to model functions, responses, processes, and the like, that produce a given output for a given input or inputs. As such, in the following description and claims, the word "function" is used as a term that includes anything that produces a given output for a given input or inputs (e.g., responses, processes, functions, etc.). Therefore, the word "function" should not be strictly limited to its typical meaning. The number of equidistant data points which are generated by computer system 100 during step 208 is based on the relationship shown below:

$$\text{Number of equidistant data points} = 1 + 2^{(n+1)}.$$

Since n is equal to the value of 1 at this point of process 200, the present embodiment directs computer system 100 to generate 5 equidistant data points for the given function being modeled. If the present embodiment were directing computer system 100 to model function 300 of FIG. 3A, data points 306–314 are the equidistant data points generated by computer system 100 during step 208.

In step 210 of FIG. 2, the present embodiment directs computer system 100 to fit a modeling curve (e.g., a spline) to the odd positioned data points, i.e., the $1^{st}$, $3^{rd}$, and $5^{th}$ data points (e.g., data points 306, 308, and 310 of FIG. 3A) of the 5 equidistant points generated during step 208. Then in step 210, the present embodiment directs computer system 100 to use the modeling curve to predict the location of the even positioned data points, i.e., the $2^{nd}$ and $4^{th}$ data points (e.g., data points 316 and 318) for the function. One type of modeling curve used in accordance with the present embodiment by computer system 100 is referred to as a spline. Generally, a spline determines a polynomial function or a series of polynomial functions that smoothly connect a given set of data points.

At step 212 of FIG. 2, the present embodiment directs computer system 100 to compute convergence criteria, which is a process of determining how close the predicted even positioned data points (e.g., data points 316 and 318 of FIG. 3A) are to the determined even positioned data points (e.g., data points 312 and 314) for the function (e.g., function 300). There are several different ways, in accordance with the present invention, that computer system 100 can be directed to compute the convergence criteria during step 212. For example, in one embodiment, the present invention directs computer system 100 in step 212 to determine the absolute distance of the predicted even positioned data points from the determined even positioned data points. Furthermore, in another embodiment, the present invention directs computer system 100, in step 212, to determine the absolute distance of the predicted even positioned data points from the determined even positioned data points, and then determine the sum of the squared differences in order to compute the convergence criteria.

At step 214 of FIG. 2, the present embodiment directs computer system 100 to determine if the convergence criteria have been satisfied. In accordance with the present embodiment, the convergence criteria of the model can be pre-established by a computer user at any desired accuracy threshold values. For instance, the convergence criteria may not be satisfied until the predicted even positioned data points are within a specific absolute distance of the determined even positioned data points for the function. If computer system 100 determines that the convergence criteria have not been satisfied during step 214, the present embodiment directs computer system 100 to return to the beginning of step 206. It should be appreciated that the more iterations of process 200 that the present embodiment directs computer system 100 to perform, the more closely the resulting model represents the desired function. If computer system 100 determines that the convergence criteria have been satisfied during step 214, the present embodiment directs computer system 100 to proceed to step 216. Within another embodiment of step 214, the present embodiment directs computer system 100 to continue performing iterations of process 200 until the convergence criteria have been satisfied for a pre-established number of consecutive iterations in order to ensure that the function has been accurately modeled. In accordance with the present invention, the number of consecutive iterations can be pre-established by a computer user at any desired integer.

In step 216 of FIG. 2, the present embodiment directs computer system 100 to exit process 200 because the function has been modeled within the desired accuracy of the convergence criteria.

In a case where computer system 100 determines that the convergence criteria have not been satisfied during step 214 of FIG. 2, the present embodiment directs computer system 100 to return to step 206, and increase the value of n. That is, in step 206, the present embodiment directs computer system 100 to increase the value of variable n by the value of one, resulting in variable n being equal to the value of 2.

At step 208 of FIG. 2, the present embodiment again directs computer system 100 to generate a specific amount of equidistant data points for the given function (e.g., function 300 of FIGS. 3A and 3B) that is being modeled. The number of equidistant data points which are generated by computer system 100 during step 208 is based on the relationship shown below:

Number of equidistant data points=$1+2^{(n+1)}$.

Therefore, since n is equal to the value of 2 at this point of process 200, the present embodiment directs computer system 100 to generate 9 equidistant data points (e.g., data points 306, 320, 312, 322, 308, 324, 314, 326, and 310 of FIG. 3B) for the given function being modeled. It should be appreciated that the 9 equidistant data points (e.g., data points 306–314 and 320–326 of FIG. 3B) generated during step 208 include the 5 equidistant data points (e.g., data points 306–314 of FIG. 3A) that were previously generated during the first iteration of step 208, described above. Therefore, it should be appreciated that the equidistant data points generated during an iteration of step 208 can be saved within a memory unit of computer system 100 in order to avoid regenerating them during a subsequent iteration of step 208, if needed.

In step 210 of FIG. 2, the present embodiment again directs computer system 100 to fit a modeling curve (e.g., a spline) to the odd positioned data points, i.e., the $1^{st}$, $3^{rd}$, $5^{th}$, $7^{th}$, and $9^{th}$ data points (e.g., data points 306, 312, 308, 314, and 310 of FIG. 3B) of the 9 equidistant points generated during step 208. Then in step 210, the present embodiment directs computer 100 to use the modeling curve to predict the location of the even positioned data points (e.g., data points 328, 330, 332, and 334) for the function. It should be appreciated that twice the amount of even positioned data points are predicted during the second iteration of step 210 than during the first iteration of step 210. Furthermore, it should also be appreciated that predicted even positioned data points 328, 330, 332, and 334 of FIG. 3B are in closer proximity to the determined even positioned data points (i.e., the $2^{nd}$, $4^{th}$, $6^{th}$, and $8^{th}$ data points) than the previous set of predicted even positioned data points 316 and 318 of FIG. 3A were located with respect to the previously determined even positioned data points 312 and 314.

At step 212 of FIG. 2, the present embodiment directs computer system 100 to compute convergence criteria, which is a process of determining how close the predicted even positioned data points (e.g., data points 328–334 of FIG. 3B) are to the determined even positioned data points (e.g., data points 320–326) for the function (e.g., function 300). Within one embodiment of the present invention, the way in which the convergence criteria of step 212 are computed remain constant during the modeling of a specific function.

In step 214 of FIG. 2, the present embodiment directs computer system 100 to determine if the convergence criteria have been satisfied. Within one embodiment of the present invention, the accuracy threshold values of the convergence criteria of step 214 chosen by the computer user remain constant during the modeling of a specific function. If computer system 100 determines that the convergence criteria have not been satisfied during step 214, the present embodiment directs computer system 100 to return to the beginning of step 206. If computer system 100 determines that the convergence criteria have been satisfied during step 214, the present embodiment directs computer system 100 to proceed to step 216, as described above.

In a case where computer system 100 determines that the convergence criteria have not been satisfied during step 214, the present embodiment directs computer system 100 to return to step 206, and increase the value of n. That is, in step 206, the present embodiment directs computer system 100 to increase the value of variable n by the value of one, resulting in variable n being equal to the value of 3.

At step 208 of FIG. 2, the present embodiment again directs computer system 100 to generate a specific amount of equidistant data points for the given function (e.g., function 300 of FIGS. 3A–3C) that is being modeled. The number of equidistant data points which are generated by computer system 100 during step 208 is based on the relationship shown below:

Number of equidistant data points=$1+2^{(n+1)}$.

Since n is equal to the value of 3 at this point of process 200, the present embodiment directs computer system 100 to generate 17 equidistant data points (e.g., data points 306, 336, 320, 338, 312, 340, 322, 342, 308, 344, 324, 346, 314, 348, 326, 350, and 310 of FIG. 3C) for the given function being modeled.

In step 210 of FIG. 2, the present embodiment again directs computer system 100 to fit a modeling curve (e.g., a spline) to the odd positioned data points, i.e., the $1^{st}$, $3^{rd}$, $5^{th}$, $7^{th}$, $9^{th}$, $11^{th}$, $13^{th}$, $15^{th}$, $17^{th}$ data points (e.g., data points 306, 320, 312, 322, 308, 324, 314, 326, and 310 of FIG. 3C) of the 17 equidistant points generated during step 208. Then in step 210, the present embodiment directs computer 100 to use the modeling curve to predict the location of the even positioned data points for the function. It should be appreciated that twice the amount of even positioned data points are predicted during the third iteration of step 210 than during the second iteration of step 210.

At step 212 of FIG. 2, the present embodiment directs computer system 100 to compute convergence criteria, which is a process of determining how close the predicted even positioned data points are to the determined even positioned data points (e.g., data points 336–350 of FIG. 3C) for the function (e.g., function 300). With reference to FIG. 3C, it should be pointed out that the predicted even positioned data points of the third iteration of process 200 are not shown because they are so closely situated to the determined even positioned data points 336–350 for function 300.

In step 214 of FIG. 2, the present embodiment directs computer system 100 to determine if convergence criteria have been satisfied. If computer system 100 determines that the convergence criteria have not been satisfied during step 214, the present embodiment directs computer system 100 to return to the beginning of step 206. If computer system 100 determines that the convergence criteria have been satisfied during step 214, the present embodiment directs computer system 100 to proceed to step 216.

At step 216 of FIG. 2, the present embodiment directs computer system 100 to exit process 200 because the function has been modeled within the desired accuracy of the convergence criteria.

Since the present invention is well suited to model functions in multiple dimensions, it should be appreciated that during the modeling of a given function, different convergence criteria can be utilized for different dimensions or different parts of the given function. As such, the present invention is equally well suited to model a given function utilizing different convergence criteria for different dimensions or different parts for the function. The advantage of this method is that the convergence criteria can be satisfied in one dimension or part of the function because it is well behaved, while an embodiment of the present invention continues modeling the dimensions or parts of the function which do not satisfy their convergence criteria. Therefore, only the dimensions or parts of the function that do not satisfy their convergence criteria are continually modeled through more iterations of an embodiment in accordance with the present invention.

Figure 4:
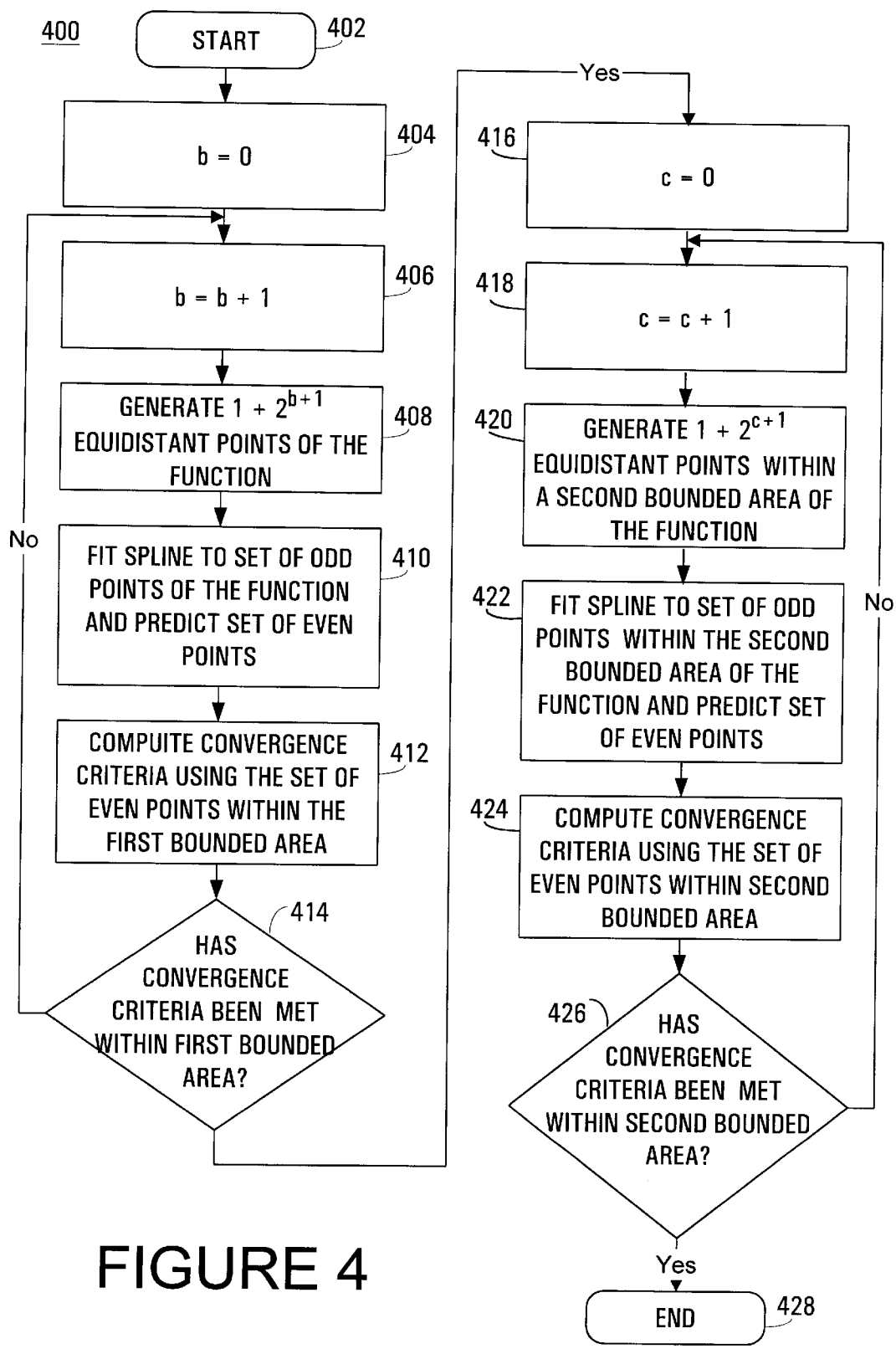
FIG. 4 is a flowchart of a method in accordance with another embodiment of the present invention for adaptive sampling for building accurate computer models of functions.

FIG. 4 is a flowchart of a method 400 in accordance with another embodiment of the present invention of adaptive sampling for building accurate computer models for functions that produce a given output for a given input or inputs. In method 400, the present embodiment directs computer system 100 of FIG. 1 to build a model of a given function by independently building two adjoining models of two adjoining parts of the given function. A computer user predetermines the boundaries of the two adjoining parts of the given function to be modeled. Specifically, the present embodiment directs computer system 100 to build a first model of a defined portion of the given function until it satisfies specific convergence criteria. Once the first model satisfies the convergence criteria, the present embodiment directs computer system 100 to build an adjoining second model of an adjoining portion of the given function until it satisfies the convergence criteria. By modeling different portions of the given function in this manner, the present embodiment does not waste time and resources continuing to model portions for the function that have already satisfied the convergence criteria. Method 400 is advantageous when modeling a given function which has both simple and complicated portions. In order to more thoroughly understand the advantages of method 400, FIG. 5 is discussed in conjunction with FIG. 4.

Figure 5:
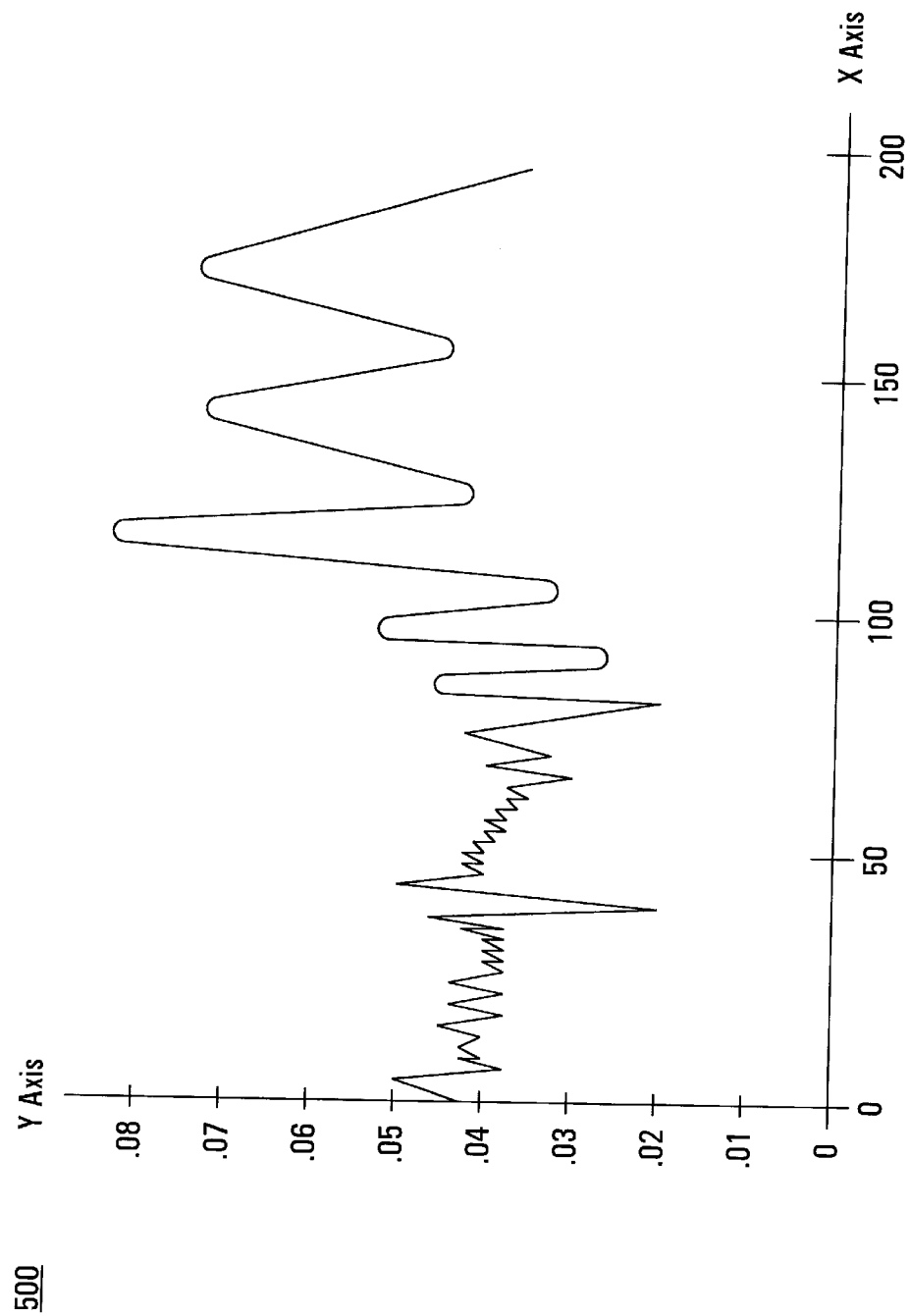
FIG. 5 is a graph representing a complex function which can be modeled by a computer system using the method of FIG. 4 in accordance with the present invention.

FIG. 5 is a graph representing a complex function 500, which can be modeled by computer system 100 of FIG. 1 using method 400 of FIG. 4 in accordance with the present invention. Notice that function 500 is very complicated when the value of the X coordinate is less than 100 and simplified when the value of X is greater than 100. As such, it should be appreciated that when a computer model is built for function 500, its simplified portion will satisfy the convergence criteria more quickly than its complex portion. Therefore, in method 400 of FIG. 4, the present embodiment directs computer system 100 of FIG. 1 to model one portion of function 500 until it satisfies the convergence criteria, before modeling the adjoining portion of function 500. By modeling different portions of function 500 in this manner, the present embodiment does not waste time and resources continuing to model portions of function 500 that have already satisfied the convergence criteria.

FIG. 4 is a flowchart of a method 400 in accordance with one embodiment of the present invention of adaptive sampling for building accurate computer models for functions that produce a given output for a given input or inputs. It should be appreciated that steps 404–414 are almost exactly the same as steps 204–214 of FIG. 2. The main difference between these two sets of steps is that in steps 404–414, the present embodiment directs computer 100 to perform various operations within a bounded area (e.g., $0 \leq x \leq 100$ of FIG. 5) in order to build a model of a portion of a given function (e.g., function 500). Furthermore, it should be appreciated that steps 406–414 of FIG. 4 are almost exactly the same as steps 416–426. The main difference between these two sets of steps is that in steps 416–426, the present embodiment directs computer 100 to perform various functions within a different bounded area (e.g., $100 \leq x \leq 200$ of FIG. 5) in order to build a model of an adjoining portion of the given function (e.g., function 500).

In step 402 of FIG. 4, the present embodiment directs computer system 100 of FIG. 1 to start process 400. At step 404, the present embodiment directs computer system 100 to set a variable b to be equal to the value of zero.

In step 406 of FIG. 4, the present embodiment directs computer system 100 to increase the value of variable b by the value of one.

At step 408 of FIG. 4, the present embodiment directs computer system 100 to generate a specific amount of equidistant data points within the first boundaries (e.g., $0 \leq x \leq 100$ of FIG. 5) of a given function (e.g., function 500) being modeled. The number of equidistant data points which are generated by computer system 100 during step 408 is based on the relationship shown below:

Number of equidistant data points=$1+2^{(b+1)}$.

Since b is equal to the value of 1 at this point of process 400, the present embodiment directs computer system 100 to generate 5 equidistant data points within the boundaries (e.g., $0 \leq x \leq 100$ of FIG. 5) of the given function being modeled (e.g., function 500).

In step 410 of FIG. 4, the present embodiment directs computer system 100 to fit a modeling curve (e.g., a spline) to the odd positioned data points, i.e., the $1^{st}$, $3^{rd}$, and $5^{th}$ data points of the 5 equidistant points generated during step 408, located within the first boundaries (e.g., $0 \leq x \leq 100$ of FIG. 5). Then in step 410, the present embodiment directs computer 100 to use the modeling curve to predict the location of the even positioned data points, i.e., the $2^{nd}$ and $4^{th}$ data points for the function within the first boundaries. One type of modeling curve used in accordance with the present embodiment by computer system 100 is referred to as a spline.

At step 412 of FIG. 4, the present embodiment directs computer system 100 to compute convergence criteria, which is a process of determining how close the predicted even positioned data points within the first boundaries (e.g., $0 \leq x \leq 100$ of FIG. 5) are to the determined even positioned data points for the function (e.g., function 500) within the first boundaries. There are several different ways, in accordance with the present invention, that computer system 100 can be directed to compute the convergence criteria of step 412, as previously described above with reference to FIG. 2.

In step 414 of FIG. 2, the present embodiment directs computer system 100 of FIG. 1 to determine if the convergence criteria have been satisfied within the first boundaries (e.g., $0 \leq x \leq 100$ of FIG. 5) of the function. In accordance with the present embodiment, the convergence criteria of the model can be pre-established by a computer user at any desired accuracy threshold values, as previously described above with reference to FIG. 2. It should be appreciated that the computer user can pre-establish different convergence criteria for different boundaries of the function to be modeled. As such, the present invention is equally well suited to utilize different convergence criteria for different parts of the function. For instance, the convergence criteria of step 414 can be different than the convergence criteria of step 426. During step 414, if computer system 100 determines that the convergence criteria have not been satisfied within the first boundaries (e.g., $0 \leq x \leq 100$), the present embodiment directs computer system 100 to return to the beginning of step 406. If computer system 100 determines that the convergence criteria have been satisfied within the first boundaries (e.g., $0 \leq x \leq 100$) during step 414, the present embodiment directs computer system 100 to proceed to step 416.

As described above, steps 416–426 of FIG. 4 are almost exactly the same as steps 404–414, except in steps 416–426, the present embodiment directs computer system 100 of FIG. 1 to model the function (e.g., function 500 of FIG. 5) within a different set of boundaries (e.g., $100 \leq x \leq 200$).

At step 428 of FIG. 4, the present embodiment directs computer system 100 to exit process 400 because the function has been modeled within the desired accuracy of the convergence criteria.

It should be appreciated that there are many different methods for modeling a given function in accordance with the present invention. For example, during the modeling of a given function, one embodiment of the present invention is able to discontinue modeling segments of the given function once they satisfy pre-established convergence criteria. As such, the well behaved segments of the function which satisfy the convergence criteria are not modeled anymore, while the present embodiment continues modeling segments of the function which do not satisfy the convergence criteria. Therefore, only the segments of the function that do not satisfy the convergence criteria are continually modeled through more iterations of the present embodiment. In this manner, the present embodiment is able to more quickly model a given function.

Thus, the present invention improves the efficiency of building computer models by enabling a computer system to model a function, process, response, and the like, using as few data points as possible. Furthermore, the present invention enables a user of the computer system to determine the convergence criterion that must be satisfied before the computer system stops modeling the desired function. Therefore, the present invention enables computer systems to model complex functions efficiently while accurately modeling them.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer readable medium having computer readable code embodied therein for causing a computer to perform a method which efficiently creates an accurate estimated graphical representation of a predetermined complex function using a reduced number of input values, said method comprising the steps of:

(a) defining a first number of actual input values to be input into said predetermined complex function;

(b) using said predetermined complex function to generate an actual output value for each of said first number of actual input values;

(c) fitting a modeling curve to a first subset of said actual output values of said predetermined complex function;

(d) using said modeling curve of said step (c) to locate predicted output values of said predetermined complex function, wherein said predicted output values correspond to a second subset of said actual output values of said predetermined complex function;

(e) comparing said predicted output values to said second subset of said actual output values to determine if said predicted output values meet a user defined convergence criterion;

(f) if said predicted output values do not meet said user defined convergence criterion, augmenting said first number of input values of step (a) and repeating steps (b) through (e); and (g) if said predicted output values meet said user defined convergence criterion, utilizing said modeling curve of step (c) to generate an estimated graphical representation of said predetermined complex function.

2. A computer readable medium as described in claim 1 wherein:

said first number of actual input values is equal to an integer; and said first subset of said actual output values of said predetermined complex function are odd positioned data points of said actual output values of said predetermined complex function.

3. A computer readable medium as described in claim 2 wherein said second subset of said actual output values of said predetermined complex function are even positioned data points of said actual output values of said predetermined complex function.

4. A computer readable medium as described in claim 1 wherein:

said first number of actual input values is equal to an integer; and said first subset of said actual output values of said predetermined complex function are even positioned data points of said actual output values of said predetermined complex function.

5. A computer readable medium as described in claim 4 wherein said second subset of said actual output values of said predetermined complex function are odd positioned data points of said actual output values of said predetermined complex function.

6. A computer readable medium as described in claim 1 wherein said step of augmenting said first number of input values as recited in step (f) comprises increasing said first number of input values.

7. A computer readable medium as described in claim 1 wherein said step of augmenting said first number of input values as recited in step (f) comprises decreasing said first number of input values.

8. A computer readable medium as described in claim 1 wherein said modeling curve is a spline.

9. In a computer system, a method for efficiently creating an accurate estimated graphical representation of a predetermined complex function using a reduced number of input values, said method comprising the computer implemented steps of:

(a) defining a first number of actual input values to be input into said predetermined complex function;

(b) using said predetermined complex function to generate an actual output value for each of said first number of actual input values;

(c) fitting a modeling curve to a first subset of said actual output values of said predetermined complex function;

(d) using said modeling curve of said step (c) to locate predicted output values of said predetermined complex function, wherein said predicted output values correspond to a second subset of said actual output values of said predetermined complex function;

(e) comparing said predicted output values to said second subset of said actual output values to determine if said predicted output values meet a user defined convergence criterion;

(f) if said predicted output values do not meet said user defined convergence criterion, augmenting said first number of input values of step (a) and repeating steps (b) through (e); and (g) if said predicted output values meet said user defined convergence criterion, utilizing said modeling curve of step (c) to generate an estimated graphical representation of said predetermined complex function.

10. A method as described in claim 9 wherein:

said first number of actual input values is equal to an integer; and said first subset of said actual output values of said predetermined complex function are odd positioned data points of said actual output values of said predetermined complex function.

11. A method as described in claim 10 wherein said second subset of said actual output values of said predetermined complex function are even positioned data points of said actual output values of said predetermined complex function.

12. A method as described in claim 9 wherein:

said first number of actual input values is equal to an integer; and said first subset of said actual output values of said predetermined complex function are even positioned data points of said actual output values of said predetermined complex function.

13. A method as described in claim 12 wherein said second subset of said actual output values of said predetermined complex function are even positioned data points of said actual output values of said predetermined complex function.

14. A method as described in claim 9 wherein said step of augmenting said first number of input values as recited in step (f) comprises increasing said first number of input values.

15. A method as described in claim 9 wherein said step of augmenting said first number of input values as recited in step (f) comprises decreasing said first number of input values.

16. A method as described in claim 9 wherein said modeling curve is a spline.

17. A computer system comprising:

a processor;

an addressable data bus coupled to said processor;

a computer readable memory coupled to communicate with said processor for performing a method which efficiently creates an accurate estimated graphical representation of a predetermined complex function using a reduced number of input values, said method comprising the steps of:

(a) defining a first number of actual input values to be input into said predetermined complex function;

(b) using said predetermined complex function to generate an actual output value for each of said first number of actual input values;

(c) fitting a modeling curve to a first subset of said actual output values of said predetermined complex function;

(d) using said modeling curve of said step (c) to locate predicted output values of said predetermined complex function, wherein said predicted output values correspond to a second subset of said actual output values of said predetermined complex function;

(e) comparing said predicted output values to said second subset of said actual output values to determine if said predicted output values meet a user defined convergence criterion;

(f) if said predicted output values do not meet said user defined convergence criterion, augmenting said first number of input values of step (a) and repeating steps (b) through (e); and (g) if said predicted output values meet said user defined convergence criterion, utilizing said modeling curve of step (c) to generate an estimated graphical representation of said predetermined complex function.

18. A computer system as described in claim 17 wherein:

said first number of actual input values is equal to an integer; and said first subset of said actual output values of said predetermined complex function are odd positioned data points of said actual output values of said predetermined complex function.

19. A computer system as described in claim 18 wherein said second subset of said actual output values of said predetermined complex function are even positioned data points of said actual output values of said predetermined complex function.

20. A computer system as described in claim 17 wherein:

said first number of actual input values is equal to an integer; and said first subset of said actual output values of said predetermined complex function are even positioned data points of said actual output values of said predetermined complex function.

21. A computer system as described in claim 20 wherein said second subset of said actual output values of said predetermined complex function are odd positioned data points of said actual output values of said predetermined complex function.

22. A computer system as described in claim 17 wherein said step of augmenting said first number of input values as recited in step (f) comprises increasing said first number of input values.

23. A computer system as described in claim 17 wherein said step of augmenting said first number of input values as recited in step (f) comprises decreasing said first number of input values.

24. A computer system as described in claim 17 wherein said modeling curve is a spline.

* * * * *